(12) United States Patent
Ejiri et al.

(10) Patent No.: US 8,560,206 B2
(45) Date of Patent: Oct. 15, 2013

(54) ENGINE CONTROL APPARATUS AND METHOD

(75) Inventors: Arata Ejiri, Kawasaki (JP); Tsugito Maruyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 360 days.

(21) Appl. No.: 12/887,812

(22) Filed: Sep. 22, 2010

(65) Prior Publication Data

US 2011/0077836 A1 Mar. 31, 2011

(30) Foreign Application Priority Data

Sep. 25, 2009 (JP) ................................. 2009-221633

(51) Int. Cl.
*G06F 19/00* (2011.01)
(52) U.S. Cl.
USPC .......................................... 701/102; 60/605.2
(58) Field of Classification Search
USPC ......... 701/101, 102, 106, 108, 114, 115, 103, 701/104, 110; 60/602, 605.2; 123/568.11, 123/568.16, 568.21; 702/183
See application file for complete search history.

(56) References Cited

U.S. PATENT DOCUMENTS

| | | | | |
|---|---|---|---|---|
| 6,035,640 A * | 3/2000 | Kolmanovsky et al. | ..... | 60/605.2 |
| 6,076,353 A * | 6/2000 | Freudenberg et al. | ....... | 60/605.2 |
| 6,128,902 A * | 10/2000 | Kolmanovsky et al. | ..... | 60/605.2 |
| 6,178,749 B1 * | 1/2001 | Kolmanovsky et al. | ..... | 60/605.2 |
| 6,408,834 B1 * | 6/2002 | Brackney et al. | ........ | 123/568.21 |
| 7,016,779 B2 * | 3/2006 | Bowyer | ........................ | 701/108 |
| 7,062,910 B2 * | 6/2006 | Inoue | ............................ | 60/605.2 |
| 7,110,876 B2 * | 9/2006 | Uchiyama et al. | ............ | 701/108 |
| 7,155,334 B1 * | 12/2006 | Stewart et al. | ................ | 701/114 |
| 7,275,374 B2 * | 10/2007 | Stewart et al. | .................. | 60/601 |
| 8,140,248 B2 * | 3/2012 | Mehendale et al. | .......... | 701/114 |
| 2006/0137340 A1 | 6/2006 | Stewart | | |
| 2007/0174003 A1 | 7/2007 | Ueno et al. | | |
| 2007/0198163 A1 | 8/2007 | Yasui et al. | | |
| 2011/0029220 A1 * | 2/2011 | Sasaki et al. | .................. | 701/106 |

FOREIGN PATENT DOCUMENTS

| | | |
|---|---|---|
| JP | 2000-356158 | 12/2000 |
| JP | 2005-299424 | 10/2005 |
| JP | 2005-351199 | 12/2005 |
| JP | 2006-189053 | 7/2006 |
| JP | 2007-192171 | 8/2007 |

OTHER PUBLICATIONS

Japanese Office Action mailed Apr. 9, 2013 for corresponding Japanese Application No. 2009-221633.

* cited by examiner

*Primary Examiner* — Stephen K Cronin
*Assistant Examiner* — Elizabeth Hadley
(74) *Attorney, Agent, or Firm* — Staas & Halsey LLP

(57) ABSTRACT

By using a model of a transient response characteristic of an engine and a model of a steady-state characteristic of the engine, a disturbance estimate value is calculated. By using this disturbance estimate value, initial command values of a nozzle opening degree of a Variable Nozzle Turbo and a valve opening degree of a Exhaust Gas Recirculator are adjusted in order to reduce model errors and appropriately handle the disturbance. Hence, it is possible to cause Mass Air Flow and Manifold Air Pressure to follow their target values stably.

7 Claims, 13 Drawing Sheets

ENGINE CONTROL APPARATUS AND METHOD

CROSS-REFERENCE TO RELATED APPLICATIONS

This application is based upon and claims the benefit of priority of the prior Japanese Patent Application No. 2009-221633, filed on Sep. 25, 2009, the entire contents of which are incorporated herein by reference.

FIELD

This technique relates to a control technique of an engine.

BACKGROUND

In a recent engine (e.g. diesel engine), in order to reduce the emission and improve the fuel-efficiency, the Mass Air Flow (MAF) and Manifold Air Pressure (MAP) are controlled optimally by an intake gas control system.

Typically, the intake gas control system of the diesel engine includes a MAP control system and MAF control system, and MAP and MAF are independently controlled each other. In order to reduce Particulate Matters (PM) in the exhaust gas, the MAP control system controls a nozzle diameter of a Variable Nozzle Turbo (VNT) to control the MAP. On the other hand, in order to reduce nitrogen oxides (NOx) in the exhaust gas, the MAF control system controls a valve opening degree of an Exhaust Gas Recirculator (EGR) that recirculates the exhaust gas into a cylinder to control MAF. A design for these control systems is made that optimum MAP and MAF, which were experimentally determined according to driving conditions (e.g. injection quantity, engine speed), are used as target values to carry out the disturbance attenuation in a steady state.

On the other hand, as depicted in FIG. 1, a technique so called "observer" exists. When no observer exists, a command value X from a controller is inputted to an actual engine Gp to obtain an output Y. However, because disturbance d is added to the command value X, the output Y shifts from the target value. Then, a model Gpm of the actual engine Gp is prepared, and the command value X is inputted into the model Gpm to obtain an output Y2. Then, a difference between the output Y of the actual engine Gp and the output Y2 of the model Gpm is inputted into a model L/Gpm to remove the influence of the model Gpm and provide a predetermined characteristic, and a disturbance estimate value dm is calculated. When this disturbance estimate value dm is subtracted from the command value X, it becomes possible to suppress the influence of the disturbance d even if the disturbance d is inputted.

A conventional art to which such an observer is applied has already existed. However, no special idea is applied to the observer.

When the observer is simply introduced to the intake gas control system, results as depicted in FIGS. 2 to 4 were obtained. FIG. 2 depicts time change of the injection quantity Q in case of using the observer and in case of using no observer. Thus, a case where the injection quantity Q is rapidly increased after time 1 is assumed. Then, as depicted in FIG. 3, the increase of the measurement value of the MAF in case of using no observer is delayed for the target value of the MAF. On the other hand, the increase of the measurement value of the MAF in case of using the observer is not so late. However, a very large overshoot has occurred. According to these results, it is impossible to adopt the observer in view of the safety. FIG. 4 represents the time change of the valve opening degree of the EGR. However, when the case of using the observer is compared with the case of using no observer, the valve opening degree in the case of using the observer changes greatly, and this causes the overshoot of the measurement value of the MAF.

SUMMARY

As described above, it can be understood that it is impossible to control the entire system favorably only by simply introducing the observer like the conventional art.

This engine control method includes (A) obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of the engine and a measurement value of a Mass Air Flow (MAF) of the engine; (B) first calculating differences between estimate values of the MAP and the MAF, which are represented by a sum of a first output of a transient response model of the engine and a second output of a steady-state model of the engine, and the measurement values of the MAP and the MAF, wherein the first output varies according to either of the setting value of the injection quantity and target values of the MAF and the MAP, which correspond to the setting values of the injection quantity and the engine speed, and the second output varies according to command values of a valve opening degree of the EGR and a nozzle opening degree of the VNT; (C) second calculating, from the differences, a first disturbance estimate value after one unit time, for the command value of the valve opening degree of the EGR, and a second disturbance estimate value after one unit time, for the command value of the nozzle opening degree of the VNT; and (D) third calculating the command values of the valve opening degree of the EGR and the nozzle opening degree of the VNT from control amounts of the valve opening degree of the EGR and the nozzle opening degree of the VNT, which are calculated from the target values of the MAP and the MAF and the measurement values of the MAP and the MAF, target values of the valve opening degree of the EGR and the nozzle opening degree of the VNT, which correspond to the setting values of the injection quantity and the engine speed, and a third disturbance estimate value at a current time for the command value of the valve opening degree of the EGR and a fourth disturbance estimate value at a current time for the command value of the nozzle opening degree of the VNT.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Figure 1:
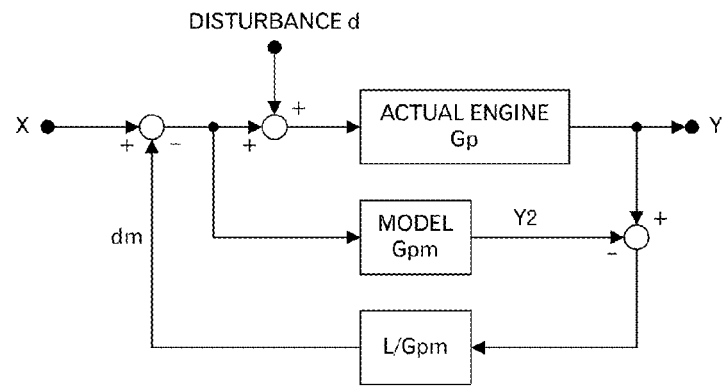
FIG. 1 is a block diagram of a typical observer.
Figure 5:
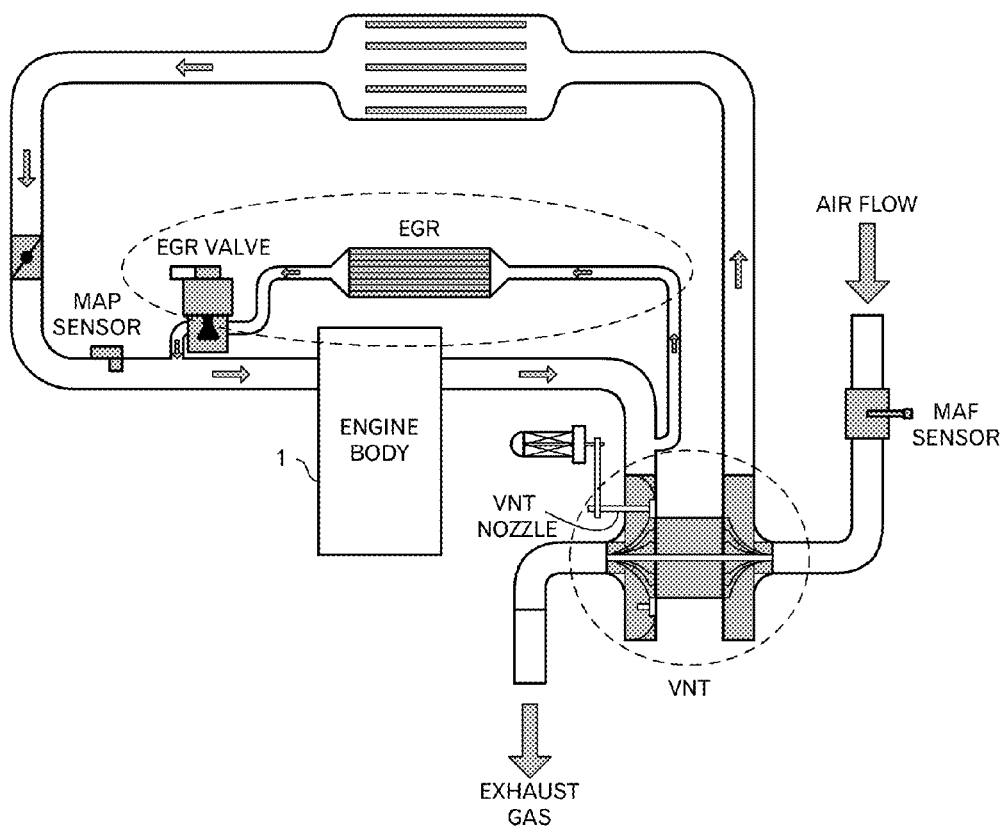
FIG. 5 is a schematic diagram of an engine.
Figure 2:
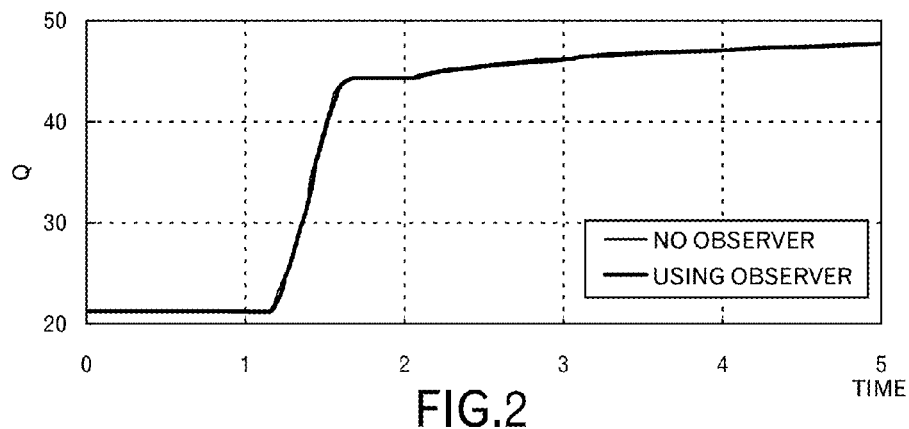
FIG. 2 is a diagram depicting an example of time change of an injection quantity Q.
Figure 3:
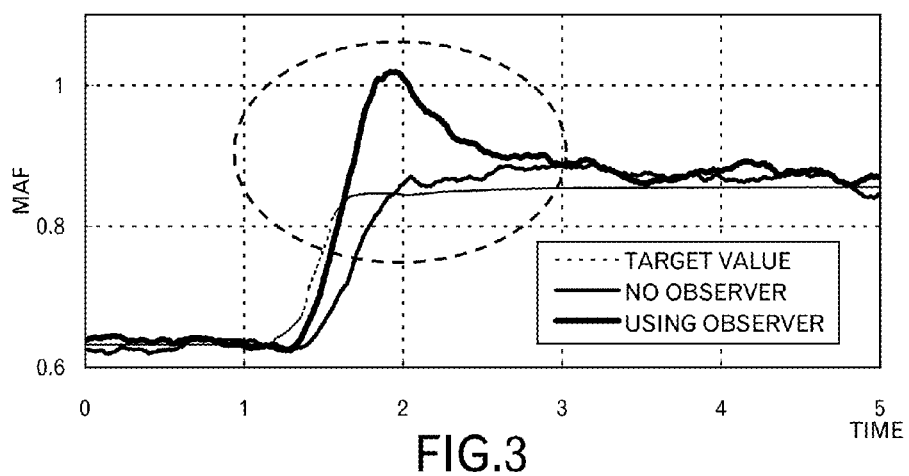
FIG. 3 is a diagram depicting an example of time change of a Mass Air Flow (MAF) in case of using no observer and in case of using an observer in a conventional technique.
Figure 4:
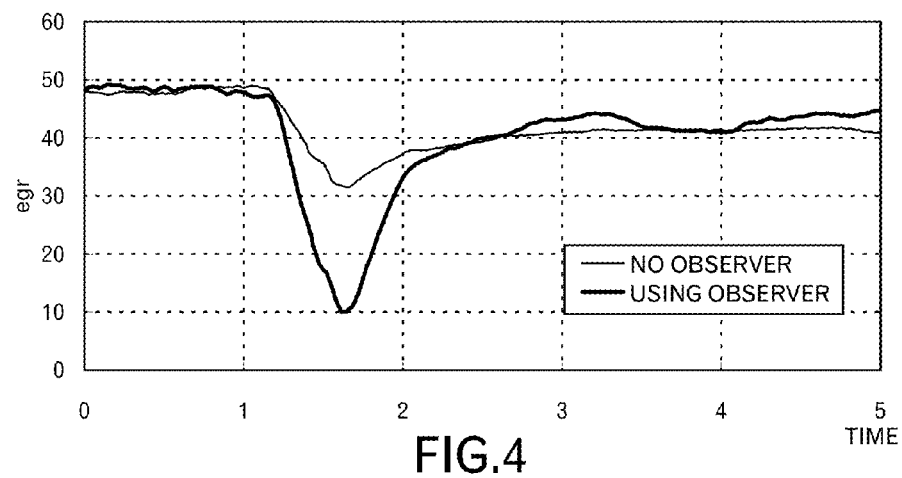
FIG. 4 is a diagram depicting an example of time change of an EGR valve opening degree in case of using no observer and incase of using an observer in a conventional technique.

FIG. 5 depicts an outline of a diesel engine as an engine relating to an embodiment of this technique. An Exhaust Gas Recirculator EGR to provide exhaust gas from an engine body 1 and a Variable Nozzle Turbo VNT to compress and provide fresh air to the engine body 1 by rotating a turbine by the pressure of the exhaust gas are coupled to the engine body 1. By adjusting a nozzle opening degree of the VNT, the rotation of the turbine of the VNT are adjusted, and a Manifold Air Pressure (MAP) measured by a MAP sensor is adjusted. On the other hand, by adjusting a valve opening degree of an EGR valve provided in the EGR, a Mass Air Flow (MAF) measured by a MAF sensor is adjusted.

Embodiment 1

Figure 6:
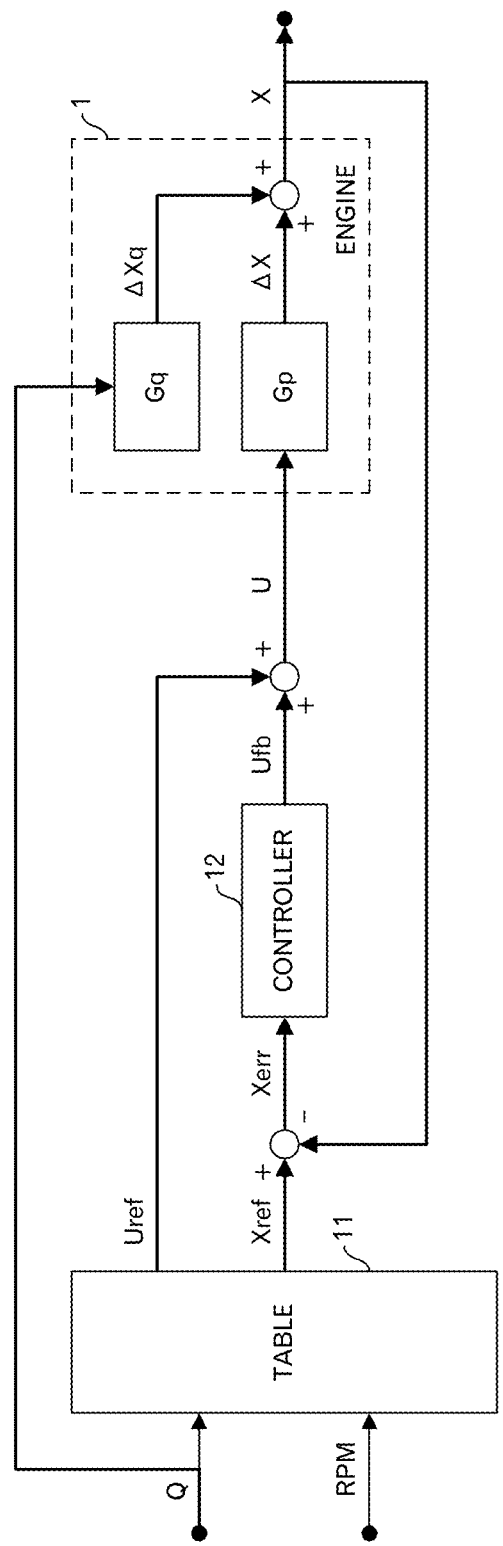
FIG. 6 is a block diagram to explain a first example of a control system of a conventional engine.

A conventional control system for such an engine is depicted by a block diagram as depicted in FIG. 6. Namely, setting values of an injection quantity Q and engine speed RPM are inputted, and target values Uref and Xref corresponding to the setting values of the injection quantity Q and engine speed RPM are read out from a table 11 in which a combination Uref (=[a target value of the EGR valve opening degree, a target value of the VNT nozzle opening degree]) of the target values of the EGR valve opening degree and the VNT nozzle opening degree and a combination Xref (=[$MAP_{ref}$, $MAF_{ref}$]) of the target values of the MAF and MAP are registered in association with a value of the injection quantity Q and a value of the engine speed RPM. Then, a difference Xerr between Xref and a combination X of the measurement values of the MAF and MAP is inputted to a controller 12, and the controller 12 calculates a combination Ufb of feedback control values of the EGR valve opening degree and the VNT nozzle opening degree. Furthermore, a command value U, which is a sum of Uref and Ufb, is calculated, and the command value U is inputted to a transfer function Gp of a steady-state characteristic of the engine body 1. The command value U is a combination (=[the valve opening degree of the EGR valve, the nozzle opening degree of the VNT]) of the valve opening degree of the EGR valve provided in the EGR and the nozzle opening degree of the VNT. Here, when Gp is operated to U, ΔX is obtained. On the other hand, when a transfer function Gq of a transient response characteristic (also called "transient characteristic" or "dynamic characteristic") of the engine body 1 is operated to the setting value of the injection quantity Q, ΔXq is obtained. Then, the operation of the engine body 1 is observed as a combination X=ΔXq+ΔX of the measurement value of the MAF by the MAF sensor and the measurement value of the MAP by the MAP sensor.

Figure 7:
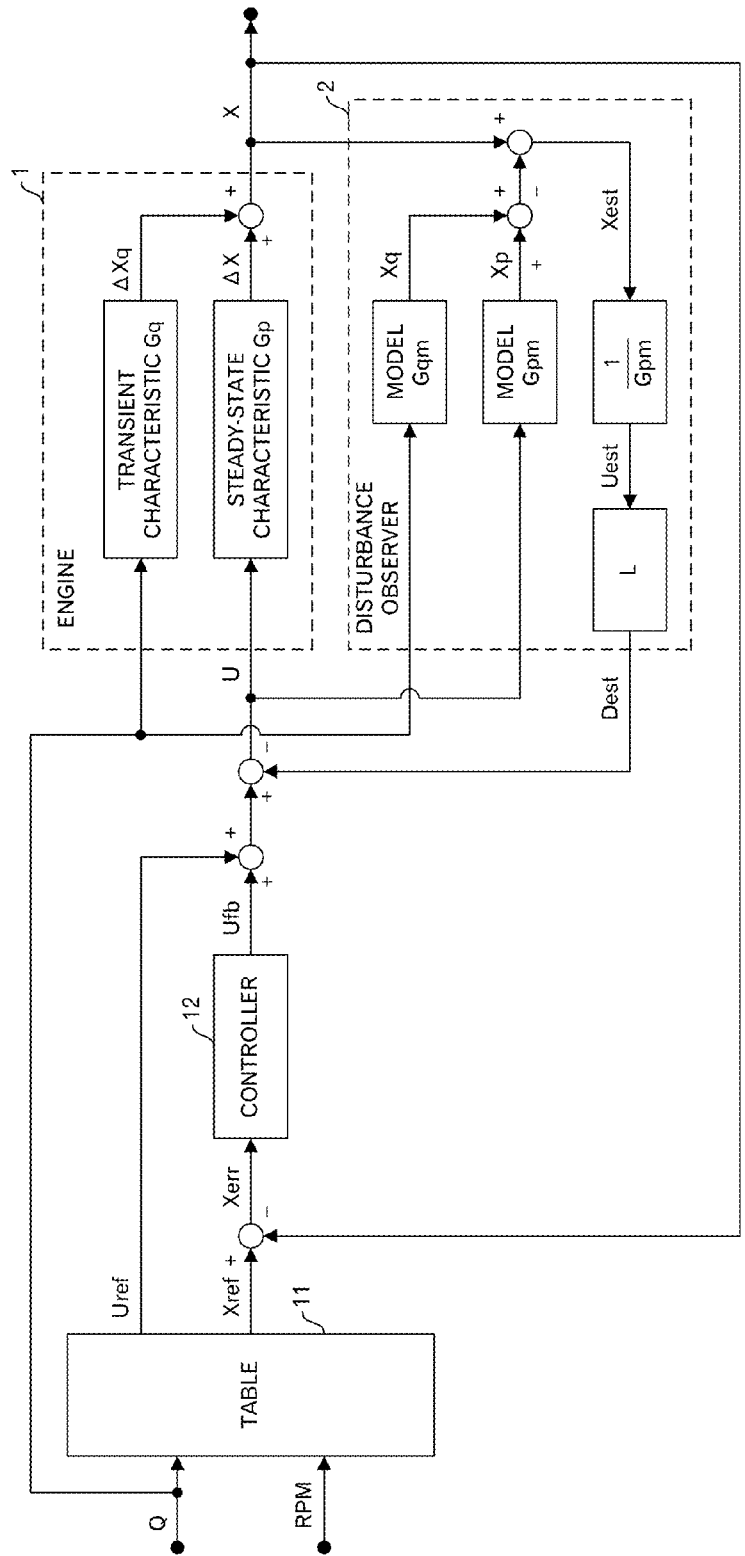
FIG. 7 is a block diagram of an engine control system in a first embodiment.

When a disturbance observer 2 relating to this embodiment is introduced to such a block diagram, a block diagram as depicted in FIG. 7 is obtained. The disturbance observer 2 includes a model Gqm of the transient response characteristic of the engine body 1, to which the setting value of the injection quantity Q is inputted; a model Gpm of the steady-state characteristic of the engine body 1, to which the command value U to the engine body 1 is inputted; a transfer function 1/Gpm to remove the influence of the model Gpm, to which Xest calculated by subtracting a sum of an output Xp of Gpm and an output Xq of Gqm from X observed in the engine body 1 is inputted; and a transfer function L of, for example, a low-pass filter of the first degree, to which the output Uest of the transfer function 1/Gpm is inputted. An output of this transfer function L is a disturbance estimate value Dest.

In the entire control system, the setting values of the injection quantity Q and the engine speed RPM are inputted, and Uref and Xref, which correspond to the setting values of the injection quantity Q and engine speed RPM, are read out from the table 11 in which a combination Uref of the target values of the EGR valve opening degree and the VNT nozzle opening degree and a combination Xref of the target values of the MAF and MAP are registered in association with the value of the injection quantity Q and the value of the engine speed RPM. Then, a difference between Xref and the combination X of the measurement values of MAF and MAP is inputted to the controller 12, and the controller 12 calculates the combination Ufb of the feedback control values of the EGR valve opening degree and the VNT nozzle opening degree. Furthermore, the command value U, which is a value calculated by subtracting the disturbance estimate value Dest before one unit time from the sum of Uref and Ufb is calculated, and the command value U is inputted to the transfer function Gp of the steady-state characteristic of the engine body 1. Here, the output ΔX of the transfer function Gp is obtained by operating Gp to U. On the other hand, when the transfer function Gq of the transient response characteristic of the engine body 1 is operated to the setting value of the injection quantity Q, ΔXq is obtained. Then, the operation of the engine body 1 is observed as the combination X=ΔXq+ΔX of the measurement value of the MAF by the MAF sensor and the measurement value of the MAP by the MAP sensor.

On the other hand, the setting value of the injection quantity Q is inputted into the model Gqm of the transient response characteristic of the engine body 1, and when Gqm is operated to the setting value of the injection quantity Q, a first output Xq is obtained. In addition, the command value U to the engine body 1 is inputted to the model Gpm of the steady-state characteristic of the engine body 1, and when Gpm is operated to the command value U, a second output Xp is obtained. Then, a sum of the first output Xq and the second output Xp is subtracted from X observed in the engine body 1 to calculate a first intermediate output Xest. This first intermediate output Xest is inputted to the transfer function 1/Gpm, and when the transfer function 1/Gpm is operated to the first intermediate output Xest, a second intermediate Uset is obtained. This second intermediate output Uest is inputted to the transfer function L, and when the transfer function L is operated to the second intermediate output Uest, the disturbance estimate value Dest is obtained. As described above, after one unit time, when this disturbance estimate value Dest is subtracted from a sum of the feedback control value Ufb and the target value Uref at that time, the command value U is obtained.

Here, Gpm is represented by a following expression.

$$Xp[t]=A_p*Xp[t-1]+B_p*U[t] \quad (1)$$

Thus, a value, which varies according to U[t], is added to a value depending on Xp[t−1], which is a value before one unit time. Incidentally, $A_p$ and $B_p$ are matrices to which the steady-state characteristic of the actual engine body 1 is reflected.

$$A_p = \begin{bmatrix} A_{p11} & A_{p12} \\ A_{p21} & A_{p22} \end{bmatrix}$$

$$B_p = \begin{bmatrix} B_{p11} & B_{p12} \\ B_{p21} & B_{p22} \end{bmatrix}$$

In addition, Gqm is represented by a following expression.

$$Xq[t]=A_q*Xq[t-1]+B_q*Q[t] \quad (2)$$

Thus, a value, which varies according to Q[t], is added to a value depending on Xq[t−1], which is a value before one unit time. Incidentally, $A_q$ and $B_q$ are matrices to which the transient response characteristic of the actual engine body 1 is reflected.

$$A_q = \begin{bmatrix} A_{q11} & A_{q12} \\ A_{q21} & A_{q22} \end{bmatrix}$$

$$B_q = \begin{bmatrix} B_{q11} & B_{q12} \\ B_{q21} & B_{q22} \end{bmatrix}$$

In addition, a following relation is also obtained from FIG. 7.

$$Xest=X[t]-(Xp[t]+Xq[t]) \quad (3)$$

Then, 1/Gpm is obtained as describe below by transforming the expression (1).

$$B_p*U[t]=Xp[t]-A_p*Xp[t-1]$$

$$U[t]=B_p^{-1}\{Xp[t]-A_p*Xp[t-1]\}$$

Therefore, a following expression is obtained.

$$Uest[t]=B_p^{-1}\{Xest[t]-A_p*Xest[t-1]\} \quad (4)$$

Thus, Xest[t] is a value calculated by subtracting a value, which varies according to Xest[t−1], which is a value before one unit time, from Xest[t].

Furthermore, the transfer function L is represented by a following expression.

$$Dest[t]=A_L*Dest[t-1]+B_L*Uest[t] \quad (5)$$

Thus, Dest[t] is a value calculated by adding a value, which varies according to Uest[t], to a value depending on Dest[t−1], which is a value before one unit time. Incidentally, $A_L$ and $B_L$ are matrices to realize a predetermined characteristic, such as a low-pass filter of the first degree.

Incidentally, incase of adopting the low-pass filter, the disturbance whose frequency is less than a cut-off frequency can be estimated. When the cut-off frequency is heightened, the frequency bandwidth of the estimated disturbance is broadened. However, because the influence of the high-frequency noise becomes large, simultaneously, the control system becomes unstable. Therefore, an appropriate cut-off frequency is determined according to the experiment results and the like.

$$A_L = \begin{bmatrix} A_{L11} & A_{L12} \\ A_{L21} & A_{L22} \end{bmatrix}$$

$$B_L = \begin{bmatrix} B_{L11} & B_{L12} \\ B_{L21} & B_{L22} \end{bmatrix}$$

Figure 8:
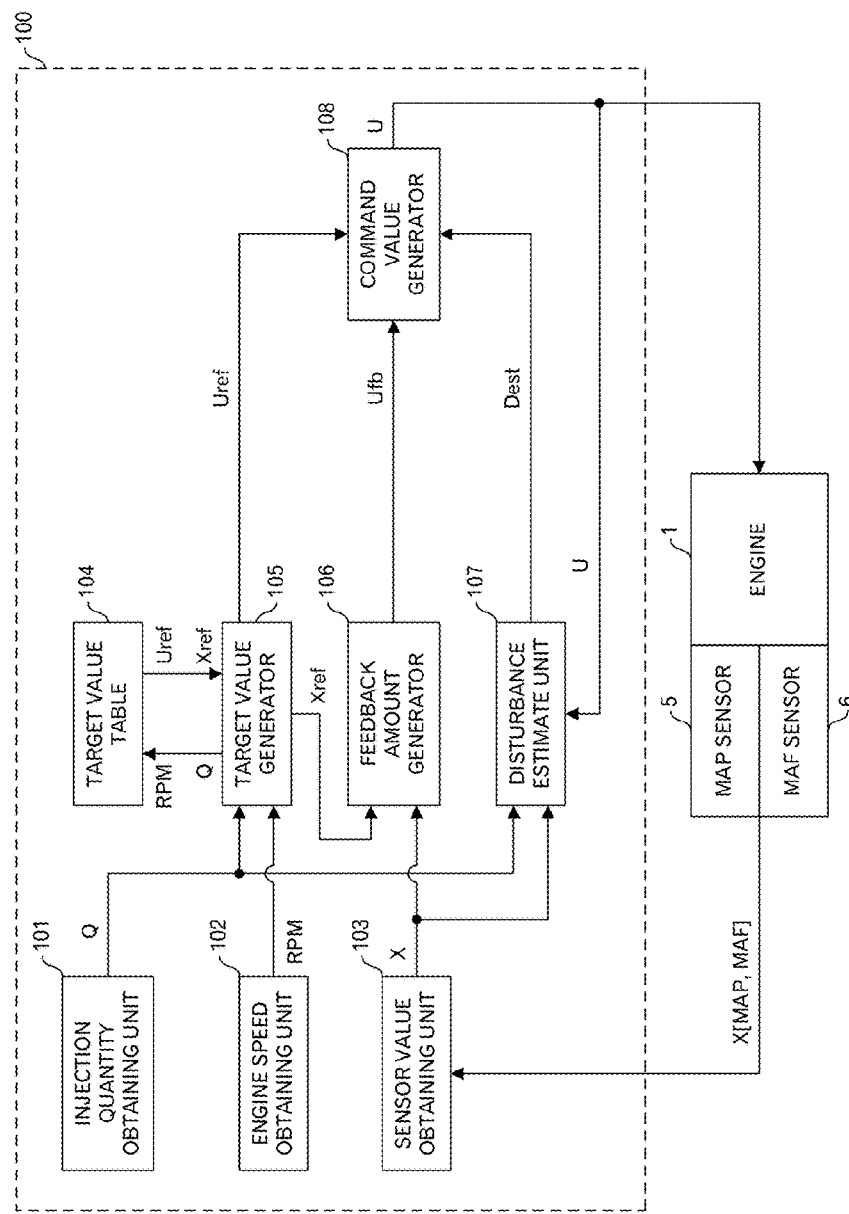
FIG. 8 is a functional block diagram of an engine control apparatus in a first embodiment.

Under such assumption, an engine control apparatus 100 relating to this embodiment has a configuration as depicted in FIG. 8. Incidentally, the engine body 1 includes the MAP sensor 5 and the MAF sensor 6. In addition, the setting values of the injection quantity and engine speed are values set in response to an instruction from a driver or the like, and provided to the engine control apparatus 100 from the outside. Incidentally, in some cases, an injection quantity measurement unit and engine speed measurement unit may be provided and the setting values may be provided from those units.

The engine control apparatus 100 includes (a) an injection quantity obtaining unit 101 to obtain the setting value of the injection quantity Q; (b) an engine speed obtaining unit 102 to obtain the setting value of the engine speed RPM; (c) a sensor value obtaining unit 103 to obtain a combination X of the measurement values of the MAF and the MAP from the MAP sensor 5 and the MAF sensor 6; (d) a target table 104 in which Uref and Xref are registered in association with the values of the injection quantity and engine speed; (e) a target value generator 105 to accept the setting value of the injection quantity Q outputted from the injection quantity obtaining unit 101 and the setting value of the engine speed RPM outputted from the engine speed obtaining unit 102 and to read out corresponding Uref and Xref from the target value table 104; (f) a disturbance estimate unit 107 to accept the setting value of the injection quantity Q outputted from the injection quantity obtaining unit 101 and to calculate the disturbance estimate value Dest by carrying out calculations described later; (g) a feedback amount generator 106 to calculate the feedback amount Ufb by using X outputted by the sensor obtaining unit 103 and Xref outputted by the target value generator 105; and (h) a command value generator 108 to accept an output Dest from the disturbance estimate unit 107, an output Uref from the target value generator 105 and an output Ufb from the feedback amount generator 106, and to generate and output to the engine body 1, the command value U.

Incidentally, as described above, the combination of the values of the EGR valve opening degree and the VNT nozzle opening degree is represented by U (=[the value of the EGR valve opening degree, the value of the VNT nozzle opening degree]), and the combination of the values of the MAF and MAP is represented by X (=[MAP, MAF]).

Figure 9:
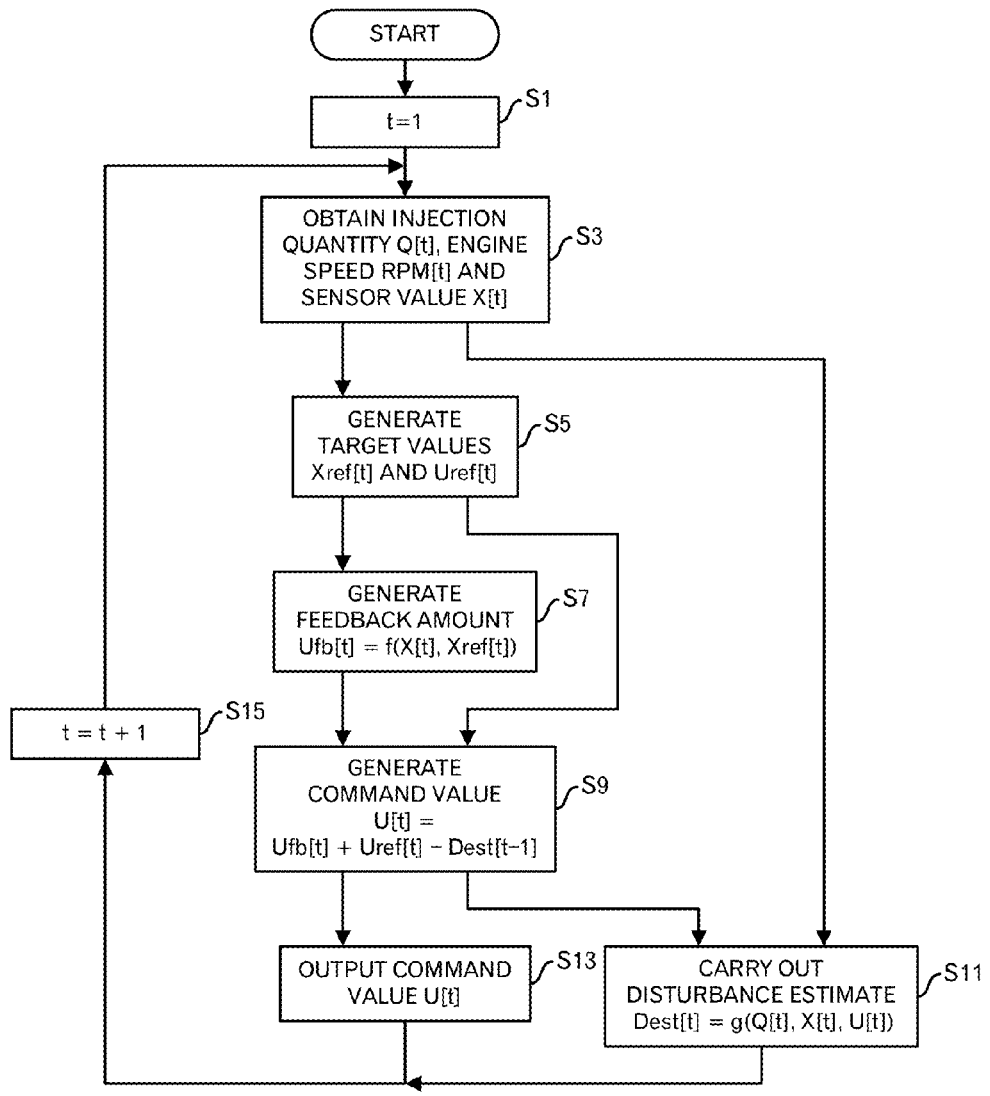
FIG. 9 is a diagram depicting a processing flow of a processing carried out by the engine control apparatus in the first embodiment.

Next, processing contents of the engine control apparatus 100 will be explained by using FIG. 9. First, at the beginning of the operation, t=1 is set as the time (step S1). Then, the injection quantity obtaining unit 101, engine speed obtaining unit 102 and sensor value obtaining unit 103 obtains the setting value Q[t] of the injection quantity, the setting value RPM[t] of the engine speed and the sensor value X[t] (step S3).

Then, the target value generator 105 generates the target values Xref[t] and Uref[t], which correspond to the setting value Q[t] of the injection quantity and the setting value RPM[t] of the engine speed, by reading out them from the target value table 104 (step S5). In addition, the feedback amount generator 106 generates the feedback amount Ufb[t] (=F(X[t], Xref[t])) from the target value Xref[t] generated by the target value generator 105 and the sensor value X[t] obtained by the sensor value obtaining unit 103 (step S7). Incidentally, because the feedback amount Ufb[t] is a value generated by the same controller 12 as the conventional one, the detailed explanation is omitted.

Then, the command value generator 108 calculates the command value U[t], which is a value calculated by subtracting the output Dest[t−1] of the disturbance estimate unit 107 at a time [t−1] before one unit time from the sum of the output Uref[t] of the target value generator 105 and the output Ufb[t] of the feedback amount generator 106 (step S9). Namely, U[t]=Ufb[t]+Uref[t]−Dest[t−1] is calculated. Dest[t−1] is read out from a memory storing values of the disturbance estimate values Dest. As described above, U[t] is a combination (=[valve opening degree of EGR valve, nozzle opening degree of VNT]) of the valve opening degree of the EGR valve provided in the EGR and the nozzle opening degree of the VNT.

Finally, the command value generator 108 outputs the command value U[t] to the engine body 1 (step S13), and the engine body 1 adjusts the valve opening degree of the EGR valve and the nozzle opening degree of the VNT according to the command value U[t].

On the other hand, the disturbance estimate unit 107 generates the disturbance estimate value Dest[t] by using the setting value Q[t] of the injection quantity from the injection quantity obtaining unit 101, the sensor value X[t] of the sensor value obtaining unit 103 and the command value U[t] (step S11). Dest[t] is represented by Dest[t]=g(Q[t], X[t], U[t]), and g(Q[t], X[t], U[t]) is a function including the calculations represented by the expressions (2) to (5). Because Dest[t] calculated at the step S11 is used at a time [t+1] after one unit time, Dest[t] is stored in the memory.

Then, the time t is incremented by "1" (step S15), and the processing returns to the step S3 until the operation of the engine body 1 stops.

Thus, by introducing the disturbance observer taking into account the transient response characteristic of the engine body 1, it becomes possible to improve the stable followingness to the target value.

Embodiment 2

In the first embodiment, as depicted in FIG. 6, the transient response characteristic of the engine body 1 is defined as a characteristic, which causes the output value ΔXq to vary according to the injection quantity Q. On the other hand, as depicted in FIG. 6, because the combination Xref (=[$MAP_{ref}$, $MAF_{ref}$]) of the target values of the MAF and MAP, which correspond to the injection quantity Q and the engine speed RPM, is obtained from the table 11, the transient response characteristic of the engine body 1 can be modeled as a characteristic, which causes the output value ΔXq to vary according to Xref as depicted in FIG. 10.

Namely, the setting values of the injection quantity Q and the engine speed RPM are inputted, and Uref and Xref, which correspond to the setting values of the injection quantity Q and the engine speed RPM, are read out from the table 11, in which the combination Uref (=[the target value of the EGR valve opening degree, the target value of the VNT nozzle opening degree]) of the target values of the EGR valve opening degree and the VNT nozzle opening degree and the combination Xref (=[$MAP_{ref}$, $MAF_{ref}$]) of the target values of the MAF and MAP are registered in association with the values of the injection quantity Q and the engine speed RPM. Then, a difference Xerr between Xref and the combination X of the measurement values of the MAF and MAP is inputted into the controller 12, and the controller 12 calculates the combination Ufb of the feedback control values of the EGR valve opening degree and the VNT nozzle opening degree. Furthermore, the command value U, which is a sum of Uref and Ufb, is calculated, and the command value U is inputted into the transfer function Gp of the steady-state characteristic of the engine body 1. The command value U is a combination (=[the EGR valve opening degree, the VNT nozzle opening degree]) of the valve opening degree of the EGR valve provided in the EGR and the nozzle opening degree of the VNT. Here, ΔX is obtained by operating Gp to U.

On the other hand, when the transfer function Gq2 of the transient response characteristic of the engine body 1 is operated to the combination Xref of the target values of the MAF and MAP, ΔXq is obtained. Then, the operation of the engine body 1 is observed as the combination X=ΔXq+ΔX of the measurement value of the MAF by the MAF sensor and the measurement value of the MAP by the MAP sensor.

Figure 10:
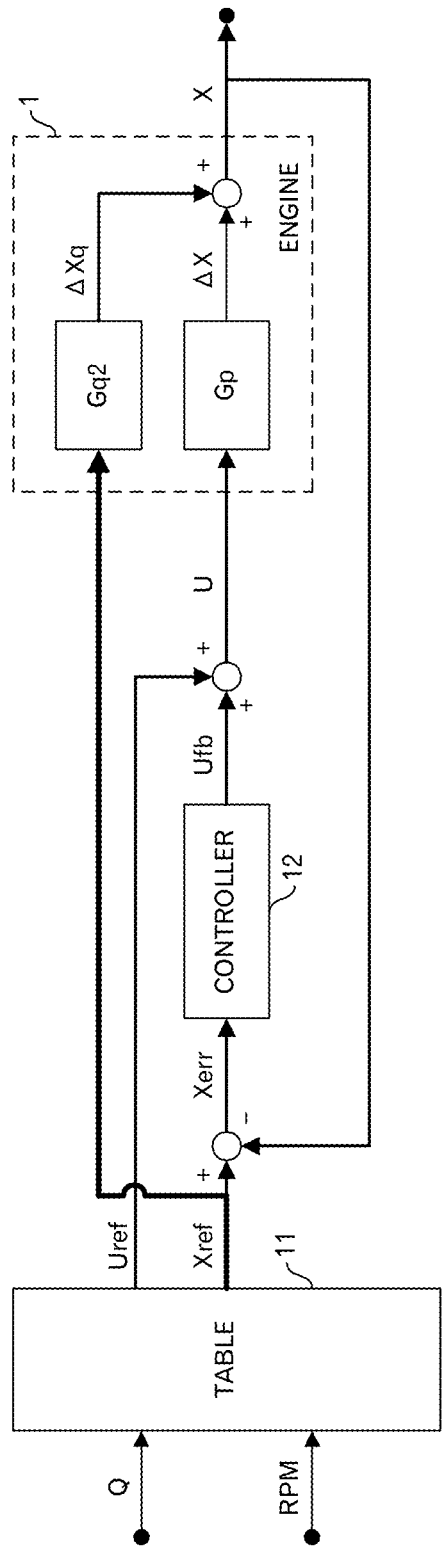
FIG. 10 is a block diagram to explain a second example of a conventional engine control system.
Figure 11:
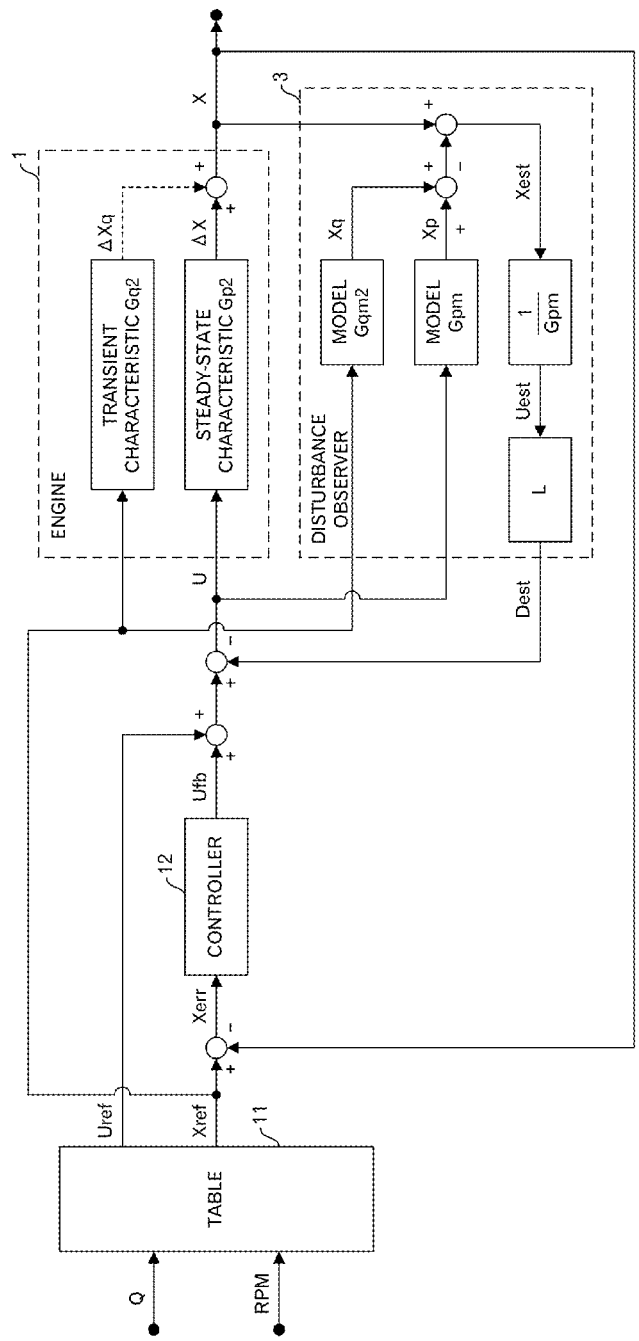
FIG. 11 is a block diagram of an engine control system in a second embodiment.

When the disturbance observer 3 relating to this embodiment is introduced into the block diagram depicted in FIG. 10, the block diagram as depicted in FIG. 11 is obtained. The disturbance observer 3 includes a model Gqm2 of the transient response characteristic of the engine body 1, to which the combination Xref of the target values of the MAF and MAP is inputted; a model Gpm of the steady-state characteristic of the engine body 1, to which the command value U to the engine body 1 is inputted; a transfer function 1/Gpm to remove the influence of the model Gpm, to which Xest calculated by subtracting a sum of an output Xp of Gpm and an output Xq of Gqm2 from X observed in the engine body 1 is inputted; and a transfer function L of, for example, a low-pass filter of the first degree, to which the output Uest of the transfer function 1/Gpm is inputted. An output of this transfer function L is a disturbance estimate value Dest.

In the entire control system, the setting values of the injection quantity Q and the engine speed RPM are inputted, and Uref and Xref, which correspond to the setting values of the injection quantity Q and engine speed RPM, are read out from the table 11 in which a combination Uref of the target values of the EGR valve opening degree and the VNT nozzle opening degree and a combination Xref of the target values of the MAF and MAP are registered in association with the value of the injection quantity Q and a value of the engine speed RPM. Then, a difference between Xref and the combination X of the measurement values of MAF and MAP is inputted to the controller 12, and the controller 12 calculates the combination Ufb of the feedback control values of the EGR valve opening degree and the VNT nozzle opening degree. Furthermore, the command value U, which is a value calculated by subtracting the disturbance estimate value Dest before one unit time from the sum of Uref and Ufb, and the command value U is inputted to the transfer function Gp2 of the steady-state characteristic of the engine body 1. Here, the output ΔX of the transfer function Gp2 is obtained by operating Gp2 to U. On the other hand, when the transfer function Gq2 of the transient response characteristic of the engine body 1 is operated to the combination Xref of the setting values of MAF and MAP, ΔXq is obtained. Then, the operation of the engine body 1 is observed as the combination X=ΔXq+ΔX of the measurement value of the MAF by the MAF sensor and the measurement value of the MAP by the MAP sensor.

On the other hand, the combination Xref of the target values of MAF and MAP is inputted into the model Gqm2 of the transient response characteristic of the engine body 1, and when Gqm2 is operated to Xref, a first output Xq is obtained. In addition, the command value U to the engine body 1 is inputted to the model Gpm of the steady-state characteristic of the engine body 1, and when Gpm is operated to the command value U, a second output Xp is obtained. Then, the sum of the first output Xq and the second output Xp is subtracted from X observed in the engine body 1 to calculate a first intermediate output Xest. This first intermediate output Xest is inputted to the transfer function 1/Gpm, and when the transfer function 1/Gpm is operated to the first intermediate output Xest, a second intermediate Uest is obtained. This second intermediate output Uest is inputted to the transfer function L, and when the transfer function L is operated to the second intermediate output Uest, the disturbance estimate value Dest is obtained. As described above, when this disturbance estimate value Dest is subtracted at a next unit time from a sum of the feedback control value Ufb and the target value Uref, the command value U is obtained.

Incidentally, Gpm is represented by the expression (1), similarly to the first embodiment.

On the other hand, Gqm2 is represented by a following expression.

$$Xq[t]=A_q*Xq[t-1]+B_{q2}*Xref[t] \quad (6)$$

Thus, a value, which varies according to Xref [t], is added to a value depending on Xp[t−1], which is a value before one unit time. Incidentally, $A_q$ and $B_{q2}$ are matrices to which the transient characteristic of the actual engine body 1 is reflected. $A_q$ is the same as the matrix in the first embodiment, and $B_{q2}$ is represented as follows:

$$B_{q2} = \begin{bmatrix} B_{q211} & B_{q212} \\ B_{q221} & B_{q222} \end{bmatrix}$$

Incidentally, the expressions (3) to (5) are the same as the expressions in the first embodiment.

Figure 12:
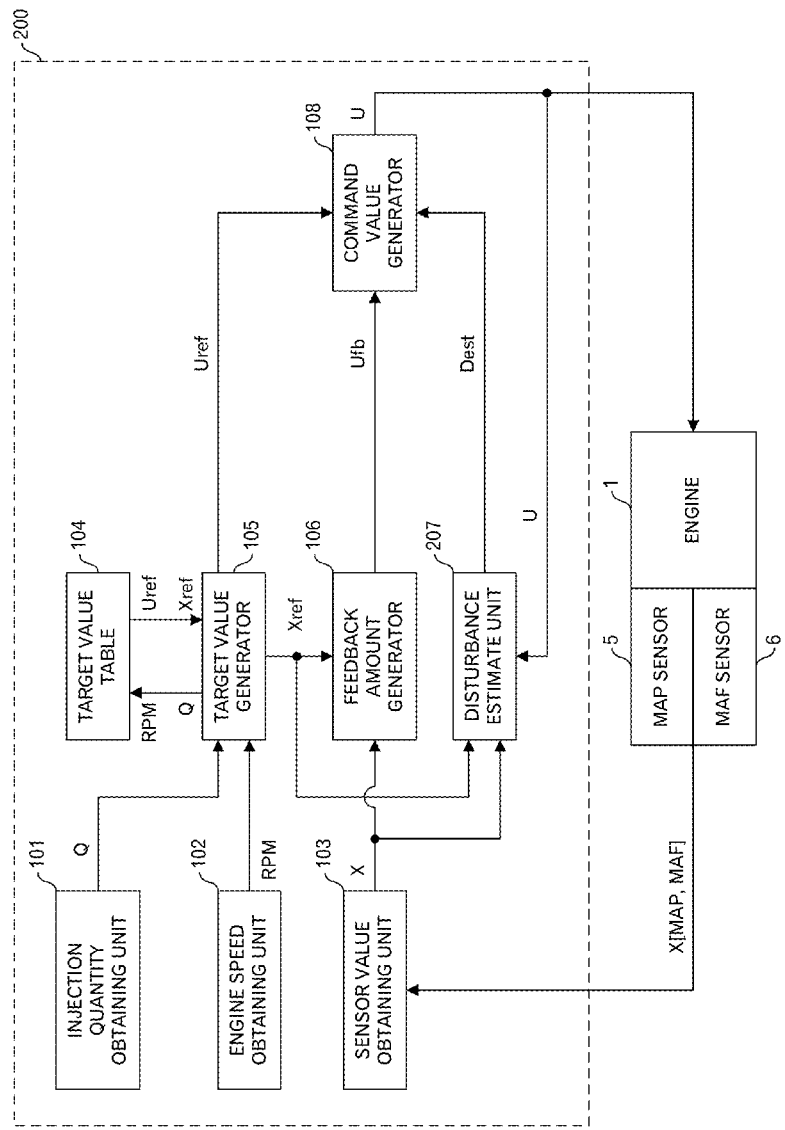
FIG. 12 is a functional block diagram of the engine control apparatus in the second embodiment.

Under such assumption, an engine control apparatus 200 relating to this embodiment has a configuration as depicted in FIG. 12. Incidentally, the engine body 1 includes the MAP sensor 5 and the MAF sensor 6. In addition, the setting values of the injection quantity and engine speed are values set in response to an instruction from a driver or the like, and provided to the engine control apparatus 200 from the outside. Incidentally, in some cases, an injection quantity measurement unit and engine speed measurement unit may be provided and the setting values may be provided from those units. In addition, the same reference numbers are attached to the same elements as the elements in the engine control apparatus 100 relating to the first embodiment.

The engine control apparatus 200 includes (a) an injection quantity obtaining unit 101 to obtain the setting value of the injection quantity Q; (b) an engine speed obtaining unit 102 to obtain the setting value of the engine speed RPM; (c) a sensor value obtaining unit 103 to obtain a combination X of the measurement values of the MAF and the MAP from the MAP sensor 5 and the MAF sensor 6; (d) a target table 104 in which Uref and Xref are registered in association with the values of the injection quantity and engine speed; (e) a target value generator 105 to accept the setting value of the injection quantity Q outputted from the injection quantity obtaining unit 101 and the setting value of the engine speed RPM outputted from the engine speed obtaining unit 102 and to read out corresponding Uref and Xref from the target value table 104; (f) a disturbance estimate unit 207 to accept Xref outputted from the target value generator 105 and to calculate the disturbance estimate value Dest by carrying out calculations described later; (g) a feedback amount generator 106 to calculate the feedback amount Ufb by using X outputted by the sensor obtaining unit 103 and Xref outputted by the target value generator 105; and (h) a command value generator 108 to accept an output Dest from the disturbance estimate unit 207, an output Uref from the target value generator 105 and an output Ufb from the feedback amount generator 106, and to generate and output to the engine body 1, the command value U.

Incidentally, as described above, the combination of the values of the EGR valve opening degree and the VNT nozzle opening degree is represented by U (=[the value of the EGR valve opening degree, the value of the VNT nozzle opening degree]), and the combination of the values of the MAF and MAP is represented by X (=[MAP, MAF]).

Figure 13:
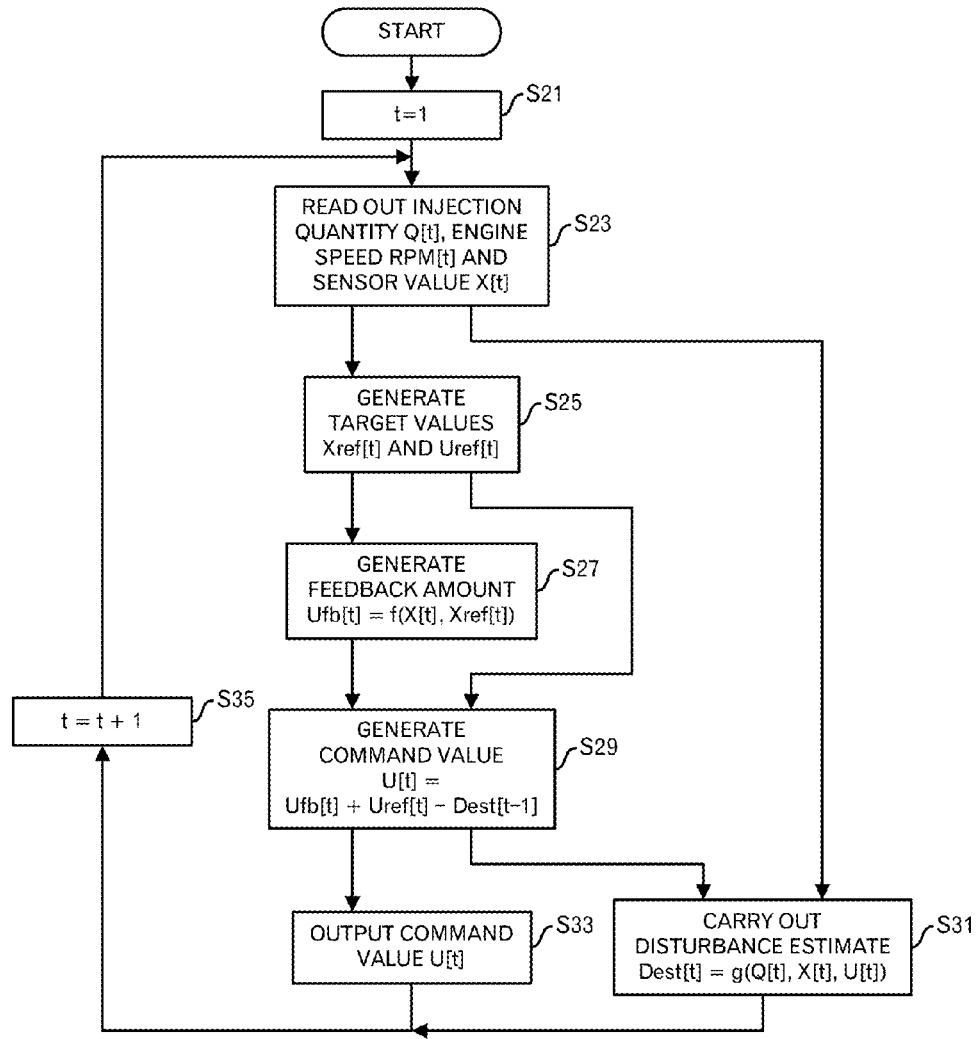
FIG. 13 is a diagram depicting a processing flow of a processing carried out by the engine control apparatus in the second embodiment.

Next, processing contents of the engine control apparatus 200 will be explained by using FIG. 13. First, at the beginning of the operation, t=1 is set as the time (step S21). Then, the injection quantity obtaining unit 101, engine speed obtaining unit 102 and sensor value obtaining unit 103 obtains the setting value Q[t] of the injection quantity, the setting value RPM[t] of the engine speed and the sensor value X[t] (step S23).

Then, the target value generator 105 generates the target values Xref [t] and Uref [t], which correspond to the setting value Q [t] of the injection quantity and the setting value RPM[t] of the engine speed, by reading out them from the target value table 104 (step S25). In addition, the feedback amount generator 106 generates the feedback amount Ufb[t] (=f(X[t], Xref[t])) from the target value Xref[t] generated by the target value generator 105 and the sensor value X[t] obtained by the sensor value obtaining unit 103 (step S27). Incidentally, because the feedback amount Ufb[t] is a value generated by the same controller 12 as the conventional one, the detailed explanation is omitted.

Then, the command value generator 108 calculates the command value U[t], which is a value calculated by subtracting the output Dest[t−1] of the disturbance estimate unit 207 at a time [t−1] before one unit time from the sum of the output Uref [t] of the target value generator 105 and the output Ufb[t] of the feedback amount generator 106 (step S29). Namely, U[t]=Ufb[t]+Uref[t]−Dest[t−1] is calculated. Dest[t−1] is read out from a memory storing values of the disturbance estimate values Dest.

Finally, the command value generator 108 outputs the command value U[t] to the engine body 1 (step S33), and the engine body 1 adjusts the valve opening degree of the EGR valve and the nozzle opening degree of the VNT according to the command value U[t].

On the other hand, the disturbance estimate unit 207 generates the disturbance estimate value Dest[t] by using Xref[t] from the target value generator 105, the sensor value X[t] from the sensor value obtaining unit 103 and the command value U[t] (step S31). Dest[t] is represented by Dest[t]=g2 (Xref[t], X[t], U[t]), and g2(Xref[t], X[t], U[t]) is a function including the calculations represented by the expressions (3) to (6). Because Dest[t] calculated at the step S31 is used at a time [t+1] after one unit time, Dest[t] is stored in the memory or storage device.

Then, the time t is incremented by "1" (step S35), and the processing returns to the step S23 until the operation of the engine body 1 stops.

Thus, by introducing the disturbance observer taking into account the transient response characteristic of the engine body 1, it becomes possible to improve the stable following-ness to the target value.

Figure 14:
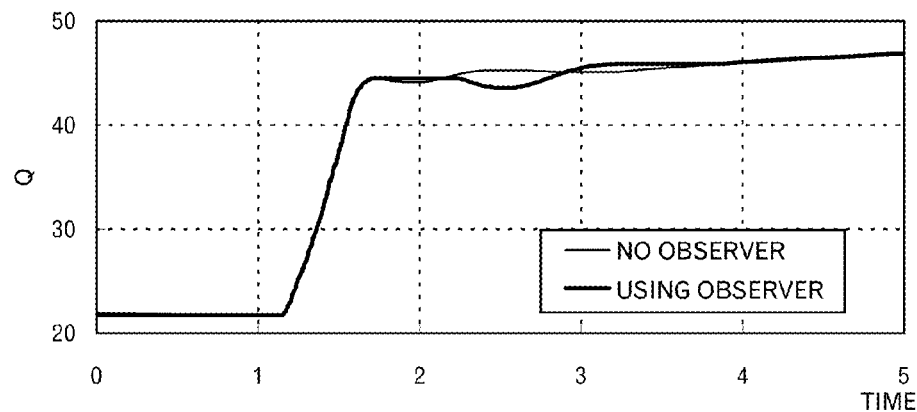
FIG. 14 is a diagram depicting an example of time change of the injection quantity Q.
Figure 15:
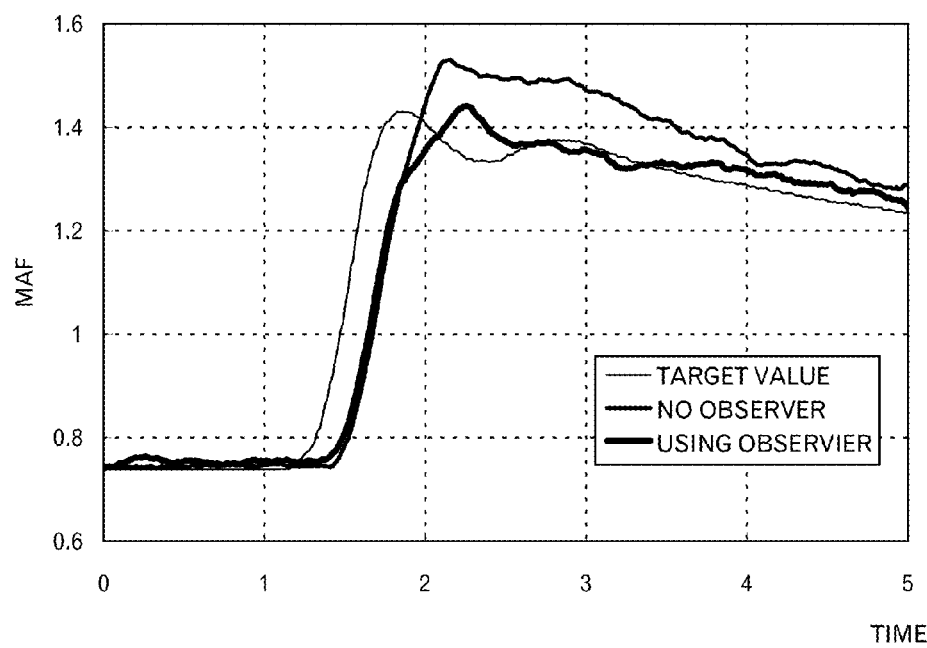
FIG. 15 is a diagram representing a relation between the MAF measurement values by the conventional technique and this embodiment for the MAF target value.

FIG. 14 depicts the time change of the injection quantity Q in case of using no observer and in case of using an observer to which this embodiment of this technique is applied. The injection quantities Q in both cases rapidly increase after time 1, while some differences occur from time 2 to 3. When such time change of the injection quantity Q exists, MAF changes as depicted in FIG. 15. Namely, the target value of MAF rapidly increases after time 1, similarly to the injection quantity Q, and then gradually decreases after that. On the other hand, in case of using no observer, the measurement value of the MAF has a large overshoot, and does not draw near the target value. However, in case of using the observer to which this embodiment is applied, although the delay of the response occurs, the overshoot is small, and the measurement value of the injection quantity Q follows the target value. Thus, it is possible to cause the MAF to stably follow the target value.

Figure 16:
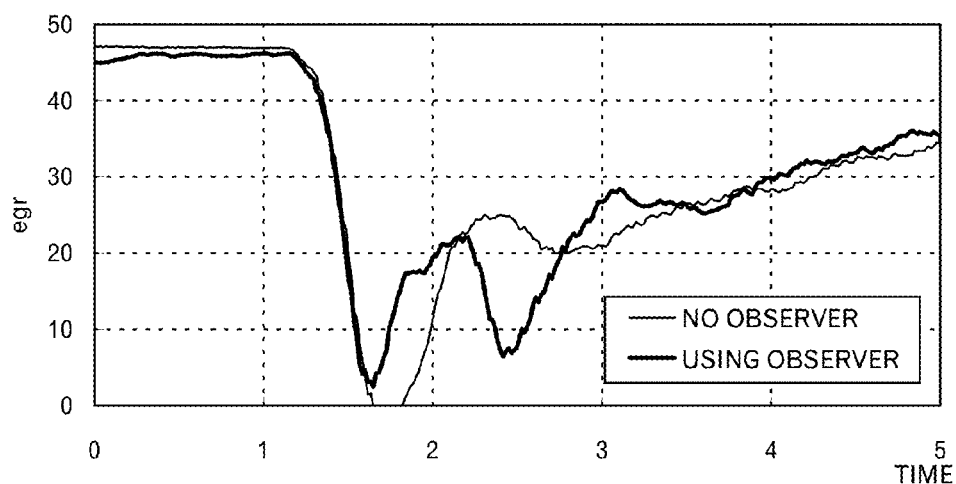
FIG. 16 is a diagram representing time change of the valve opening degree of the EGR valve.

Incidentally, FIG. 16 depicts time change of the valve opening degree of the EGR. Apparently, it can be understood that the control is carried out in different manners between the case of using no observer and the case of using the observer.

Although embodiments of this technique were explained, this technique is not limited to these embodiments. For example, the functional block diagrams as depicted in FIGS. 8 and 12 are mere examples, and the program module configuration in these embodiments does not always correspond to the actual program module configuration.

In addition, the engine is not limited to the diesel engine, and this technique can be applied to the engine having EGR and VNT.

Incidentally, it is not explicitly described that a saturation element, namely a limiter, is included in the steady-state characteristic of the aforementioned engine. However, the command value U represents a combination [value of the EGR valve opening degree, value of the VNT nozzle opening degree], and both of the valve opening degree and the nozzle opening degree out of a predetermined range such as a range from 0% to 100% cannot be instructed. Therefore, even if an instruction under the lower limit or over the upper limit is inputted, it is impossible to control the engine as it is. Then, the value range of the command value U is limited by the limiter, and the model Gpm of the steady-state characteristic of the engine includes the limiter to limit the value range. Specifically, as for the command value U under the lower limit, the lower limit is inputted to the model Gpm of the steady-state characteristic of the engine, and as for the command value U over the upper limit, the upper limit value is inputted to the model Gpm of the steady-state characteristic of the engine.

Figure 17:
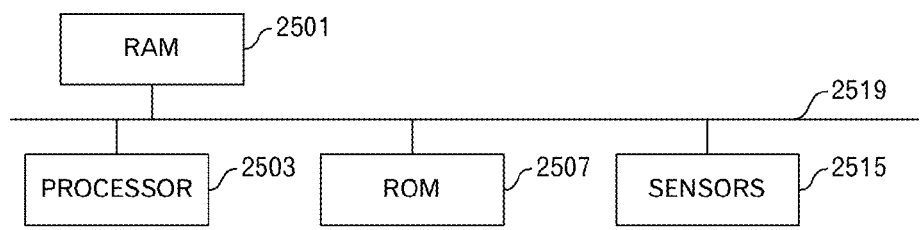
FIG. 17 is a functional block diagram of a computer.

Incidentally, the engine control apparatuses as depicted in FIGS. 8 and 12 are computer apparatuses. That is, a Random Access memory (RAM) 2501, a processor 2503, a Read Only Memory (ROM) 2507 and a sensors 2515 are connected through a bus 2519 as shown in FIG. 17. A control program for carrying out the processing in the embodiment (and an Operating System (OS) if it exists) is stored in the ROM 2507, and when executed by the processor 2503, they are read out from the ROM 2507 to the RAM 2501. The processor 2503 controls the sensors (MAP sensor 5 and MAF sensor 6. According to circumstances, injection quantity measurement unit and engine speed measurement unit), and obtains measurement values. In addition, intermediate processing data is stored in the RAM 2501. Incidentally, the processor 2503 may include the ROM 2507, and may further include the RAM 2501. In this embodiment, the control program for carrying out the aforementioned processing may be distributed by a computer-readable storage removable disk in which the control program is recorded, and the control program may be written into the ROM 2507 by a ROM writer. In the computer apparatus as stated above, the hardware such as the processor 2503 and RAM 2501 and the ROM 2507 and the control program (and OS if it exists) systematically cooperate with each other, so that various functions as described above in details are realized.

The aforementioned embodiments are outlined as follows:

This engine control method includes (A) obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of the engine and a measurement value of a Mass Air Flow (MAF) of the engine; (B) first calculating differences between estimate values of the MAP and the MAF, which are represented by a sum of a first output of a transient response model of the engine and a second output of a steady-state model of the engine, and the measurement values of the MAP and the MAF, wherein the first output varies according to either of the setting value of the injection quantity and target values of the MAF and the MAP, which correspond to the setting values of the injection quantity and the engine speed, and the second output varies according to command values of a valve opening degree of the EGR and a nozzle opening degree of the VNT; (C) second calculating, from the differences, a first disturbance estimate value after one unit time, for the command value of the valve opening degree of the EGR, and a second disturbance estimate value after one unit time, for the command value of the nozzle opening degree of the VNT; and (D) third calculating the command values of the valve opening degree of the EGR and the nozzle opening degree of the VNT from control amounts of the valve opening degree of the EGR and the nozzle opening degree of the VNT, which are calculated from the target values of the MAP and the MAF and the measurement values of the MAP and the MAF, target values of the valve opening degree of the EGR and the nozzle opening degree of the VNT, which correspond to the setting values of the injection quantity and the engine speed, and a third disturbance estimate value at a current time for the command value of the valve opening degree of the EGR and a fourth disturbance estimate value at a current time for the command value of the nozzle opening degree of the VNT.

Thus, because the disturbance estimate values are calculated taking into account the output of the transient response model of the engine, it is possible to improve the following-ness to the target value.

The first calculating may include: (b1) calculating a first estimate value of the MAP and a first estimate value of the MAF according to the transient response model of the engine from either of the setting value of the injection quantity and the target values of the MAF and the MAP, which correspond to the setting values of the injection quantity and the engine speed; (b2) calculating a second estimate value of the valve opening degree of the EGR and a second estimate value of the nozzle opening degree of the VNT from the command values of the valve opening degree of the EGR and the nozzle opening degree of the VNT according to the steady-state model of the engine; and (b2) calculating a first difference between the measurement value of the MAP and a sum of the first and second estimate values of the MAP and a second difference between the measurement value of the MAF and a sum of the first and second estimate values of the MAF. In addition, the second calculating may include: (c1) calculating, from the first and second differences, the first disturbance estimate value for the command value of the valve opening degree of the EGR and the second disturbance estimate value for the command value of the nozzle opening degree of the VNT, according to a model to remove influence of the steady-state characteristic of the engine and provide a predetermined characteristic.

By carrying out such a processing, it is possible to remove errors of the model, and it is possible to further estimate the disturbance, appropriately.

Incidentally, the aforementioned predetermined characteristic may be a characteristic of a low-pass filter of the first degree. Accordingly, the disturbance whose frequency is equal to or less than the cut-off frequency can be estimated. Incidentally, because the control system becomes unstable if the cut-off frequency increases, an appropriate cut-off frequency is set. In addition, a first model to remove the influence of the steady-state of the engine and a second model having the predetermined characteristic may be provided separately to carry out the calculation, respectively.

Furthermore, this method may further include reading out the target values of the MAP and the MAF, which correspond to the setting values of the injection quantity and the engine speed, from a table in which target values of the MAP and the MAF are registered in association with values of the injection quantity and the engine speed. Such a table may be stored in a memory, and the read target values may be calculated without using the table.

This method may further include reading out the target values of the valve opening degree of the EGR and the nozzle opening degree of the VNT, which correspond to the setting values of the injection quantity and the engine speed, from a table in which target values of the valve opening degree of the EGR and the nozzle opening degree of the VNT are registered in association with values of the injection quantity and the engine speed. Such a table may be stored in a memory, and the read target values may be calculated without using the table.

Figure 18:
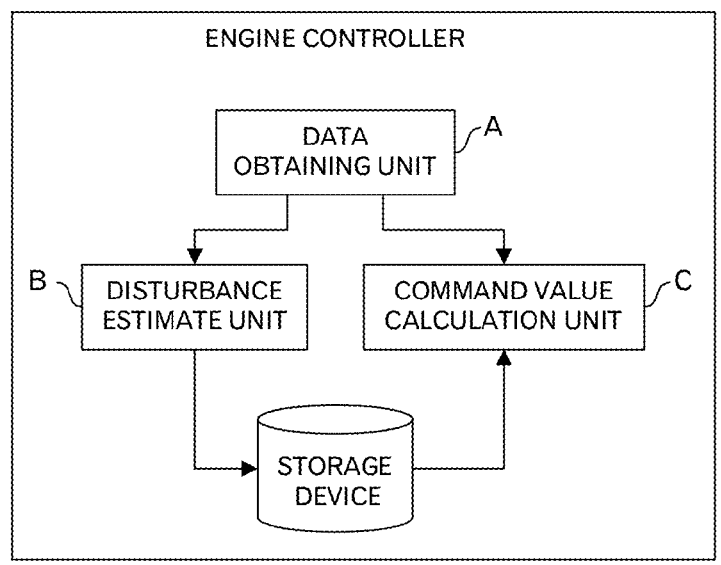
FIG. 18 is a functional block diagram of an engine control apparatus.

An engine control apparatus as depicted in FIG. 18 includes: (aa) a memory; (a) a data obtaining unit to obtain a setting value of an injection quantity to an engine having an Exhaust Gas Recirculator (EGR) and a Variable Nozzle Turbo (VNT), a setting value of an engine speed, a measurement value of a Manifold Air Pressure (MAP) of the engine and a measurement value of a Mass Air Flow (MAF) of the engine; (b) a disturbance estimate unit to calculate differences between estimate values of the MAP and the MAF, which are represented by a sum of a first output of a transient response model of the engine and a second output of a steady-state model of the engine, and the measurement values of the MAP and the MAF, wherein the first output varies according to either of the setting value of the injection quantity and target values of the MAF and the MAP, which correspond to the setting values of the injection quantity and the engine speed, and the second output varies according to command values of a valve opening degree of the EGR and a nozzle opening degree of the VNT, and to calculate, from the differences, a first disturbance estimate value after one unit time, for the command value of the valve opening degree of the EGR, and a second disturbance estimate value after one unit time for the command value of the nozzle opening degree of the VNT and to store the calculated first and second disturbance estimate value into the memory; (c) a command value calculation unit to calculate the command values of the valve opening degree of the EGR and the nozzle opening degree of the VNT from control amounts of the valve opening degree of the EGR and the nozzle opening degree of the VNT, which are calculated from the target values of the MAP and the MAF and the measurement values of the MAP and the MAF, target values of the valve opening degree of the EGR and the nozzle opening degree of the VNT, which correspond to the setting values of the injection quantity and the engine speed, and a third disturbance estimate value at a current time for the command value of the valve opening degree of the EGR and a fourth disturbance estimate value at a current time for the command value of the nozzle opening degree of the VNT.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing an engine control program for causing a processor to execute a process comprising:
    obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine including a MAP estimate value and a measurement value of a Mass Air Flow (MAF) of said engine including a MAF estimate value;
    first calculating differences between the estimate values of said MAP and said MAF, which are represented by a sum of a first output of a transient response model of said engine and a second output of a steady-state model of said engine, and said measurement values of said MAP and said MAF, wherein said first output varies according to either of said setting value of said injection quantity and target values of said MAF and said MAP, which correspond to said setting values of said injection quantity and said engine speed, and said second output varies according to command values of a valve opening degree of said EGR and a nozzle opening degree of said VNT;
    second calculating, from said differences, a first disturbance estimate value after one unit time, for said command value of said valve opening degree of said EGR, and a second disturbance estimate value after one unit time, for said command value of said nozzle opening degree of said VNT;
    third calculating said command values of said valve opening degree of said EGR and said nozzle opening degree of said VNT from control amounts of said valve opening degree of said EGR and said nozzle opening degree of said VNT, which are calculated from said target values of said MAP and said MAF and said measurement values of said MAP and said MAF, target values of said valve opening degree of said EGR and said nozzle opening degree of said VNT, which correspond to said setting values of said injection quantity and said engine speed, and a third disturbance estimate value at a current time for said command value of said valve opening degree of said EGR and a fourth disturbance estimate value at a current time for said command value of said nozzle opening degree of said VNT; and outputting said command values of said valve opening degree of said EGR and said nozzle opening degree of said VNT.

2. The non-transitory computer-readable storage medium as set forth in claim 1, wherein said first calculating comprises:

calculating a first estimate value of said MAP and a first estimate value of said MAF according to said transient response model of said engine from either of said setting value of said injection quantity and said target values of said MAF and said MAP, which correspond to said setting values of said injection quantity and said engine speed;

calculating a second estimate value of said MAP and a second estimate value of said MAF from said command values of said valve opening degree of said EGR and said nozzle opening degree of said VNT according to said steady-state model of said engine; and calculating a first difference between said measurement value of said MAP and a sum of said first and second estimate values of said MAP and a second difference between said measurement value of said MAF and a sum of said first and second estimate values of said MAF; and wherein said second calculating comprises:

calculating, from said first and second differences, said first disturbance estimate value for said command value of said valve opening degree of said EGR and said second disturbance estimate value for said command value of said nozzle opening degree of said VNT, according to a model to remove influence of said steady-state characteristic of said engine and provide a predetermined characteristic.

3. The non-transitory computer-readable storage medium as set forth in claim 2, wherein said predetermined characteristic is a characteristic of a low-pass filter of a first degree.

4. The non-transitory computer-readable storage medium as set forth in claim 1, wherein said process further comprises:

reading out said target values of said MAP and said MAF, which correspond to said setting values of said injection quantity and said engine speed, from a table in which target values of said MAP and said MAF are registered in association with values of said injection quantity and said engine speed.

5. The non-transitory computer-readable storage medium as set forth in claim 1, wherein said process further comprises:

reading out said target values of said valve opening degree of said EGR and said nozzle opening degree of said VNT, which correspond to said setting values of said injection quantity and said engine speed, from a table in which target values of said valve opening degree of said EGR and said nozzle opening degree of said VNT are registered in association with values of said injection quantity and said engine speed.

6. An engine control apparatus, comprising:

a data obtaining unit to obtain a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine;

a disturbance estimate unit to calculate differences between estimate values of said MAP and said MAF, which are represented by a sum of a first output of a transient response model of said engine and a second output of a steady-state model of said engine, and said measurement values of said MAP and said MAF, wherein said first output varies according to either of said setting value of said injection quantity and target values of said MAF and said MAP, which correspond to said setting values of said injection quantity and said engine speed, and said second output varies according to command values of a valve opening degree of said EGR and a nozzle opening degree of said VNT, and to calculate, from said differences, a first disturbance estimate value after one unit time, for said command value of said valve opening degree of said EGR, and a second disturbance estimate value after one unit time, for said command value of said nozzle opening degree of said VNT; and a command value calculation unit to calculate and output said command values of said valve opening degree of said EGR and said nozzle opening degree of said VNT from control amounts of said valve opening degree of said EGR and said nozzle opening degree of said VNT, which are calculated from said target values of said MAP and said MAF and said measurement values of said MAP and said MAF, target values of said valve opening degree of said EGR and said nozzle opening degree of said VNT, which correspond to said setting values of said injection quantity and said engine speed, and a third disturbance estimate value at a current time for said command value of said valve opening degree of said EGR and a fourth disturbance estimate value at a current time for said command value of said nozzle opening degree of said VNT.

7. An engine control method, comprising:

obtaining a setting value of an injection quantity to an engine having an Exhaust Gas Recirculator (EGR) and a Variable Nozzle Turbo (VNT), a setting value of an engine speed, a measurement value of a Manifold Air Pressure (MAP) of said engine and a measurement value of a Mass Air Flow (MAF) of said engine;

first calculating differences between estimate values of said MAP and said MAF, which are represented by a sum of a first output of a transient response model of said engine and a second output of a steady-state model of said engine, and said measurement values of said MAP and said MAF, wherein said first output varies according to either of said setting value of said injection quantity and target values of said MAF and said MAP, which correspond to said setting values of said injection quantity and said engine speed, and said second output varies according to command values of a valve opening degree of said EGR and a nozzle opening degree of said VNT;

second calculating, from said differences, a first disturbance estimate value after one unit time, for said command value of said valve opening degree of said EGR, and a second disturbance estimate value after one unit time, for said command value of said nozzle opening degree of said VNT; and third calculating and outputting said command values of said valve opening degree of said EGR and said nozzle opening degree of said VNT from control amounts of said valve opening degree of said EGR and said nozzle opening degree of said VNT, which are calculated from said target values of said MAP and said MAF and said measurement values of said MAP and said MAF, target values of said valve opening degree of said EGR and said nozzle opening degree of said VNT, which correspond to said setting values of said injection quantity and said engine speed, and a third disturbance estimate value at a current time for said command value of said valve opening degree of said EGR and a fourth disturbance estimate value at a current time for said command value of said nozzle opening degree of said VNT.

* * * * *